(12) United States Patent
Chang (10) Patent No.: US 9,120,349 B2
(45) Date of Patent: Sep. 1, 2015

(54) QUICK-RELEASE DEVICE FOR USE ON A BICYCLE

(76) Inventor: Chin-Chao Chang, Taichung (TW)

(*) Notice: Subject to any disclaimer, the term of this patent is extended or adjusted under 35 U.S.C. 154(b) by 595 days.

(21) Appl. No.: 13/517,857

(22) Filed: Jun. 14, 2012

(65) Prior Publication Data

US 2013/0334871 A1    Dec. 19, 2013

(51) Int. Cl.
*B60B 35/04* (2006.01)
*B60B 27/02* (2006.01)

(52) U.S. Cl.
CPC .................................. *B60B 27/026* (2013.01)

(58) Field of Classification Search
CPC ......... F16B 37/08; B62K 25/02; B60B 35/04; B60B 27/023; B60B 27/026; F16L 37/24
USPC ............. 301/110.5, 110.6, 124.1, 124.2, 132; 280/279, 280, 288
See application file for complete search history.

(56) References Cited

U.S. PATENT DOCUMENTS

| | | | | |
|---|---|---|---|---|
| 4,400,038 A * | 8/1983 | Hosokawa | .................. | 301/124.2 |
| 5,135,330 A * | 8/1992 | Chen | .......................... | 403/374.5 |
| 5,526,661 A * | 6/1996 | Lin | .................................. | 70/233 |
| 5,823,555 A * | 10/1998 | Ashman | ........................ | 280/279 |
| 7,090,308 B2 * | 8/2006 | Rose et al. | .................. | 301/110.5 |
| 7,673,947 B2 * | 3/2010 | Chang | ........................ | 301/124.2 |
| 8,186,768 B2 * | 5/2012 | Spahr | .......................... | 301/124.2 |
| 8,573,878 B2 * | 11/2013 | Chang | ........................ | 403/322.4 |
| 8,820,854 B2 * | 9/2014 | Howes | ........................ | 301/124.2 |
| 2009/0121538 A1 * | 5/2009 | Chang | ........................ | 301/124.2 |
| 2009/0261648 A1 * | 10/2009 | Cusack | ........................ | 301/124.2 |
| 2010/0109425 A1 * | 5/2010 | Montague et al. | ......... | 301/124.2 |
| 2013/0033096 A1 * | 2/2013 | Howes | ........................ | 301/124.2 |

\* cited by examiner

*Primary Examiner* — S. Joseph Morano
*Assistant Examiner* — Jean Charleston (57) ABSTRACT

A quick-release device for use on a bicycle includes a lever, an axle rotatably received in the lever, a shaft extending through the axle, a force device sleeved on the shaft, at least one spring sleeved on the shaft and a nut screwed onto the shaft. The axle includes an indentation defined therein and a first abutment formed on a bottom of the indentation. The shaft includes a shank and a head formed one end of the shank such that a second abutment is formed between the shank and the head. The head is received and engaged in the indentation such that the shank can not be rotated relative to the axle and the connected of the quick-quick device in promoted.

18 Claims, 9 Drawing Sheets

QUICK-RELEASE DEVICE FOR USE ON A BICYCLE

BACKGROUND OF THE INVENTION

1. Field of the Invention

The present invention relates to a quick-release device, and more particularly to a quick-release device that is provided for used on a bicycle.

2. Description of Related Art

Figure 1:
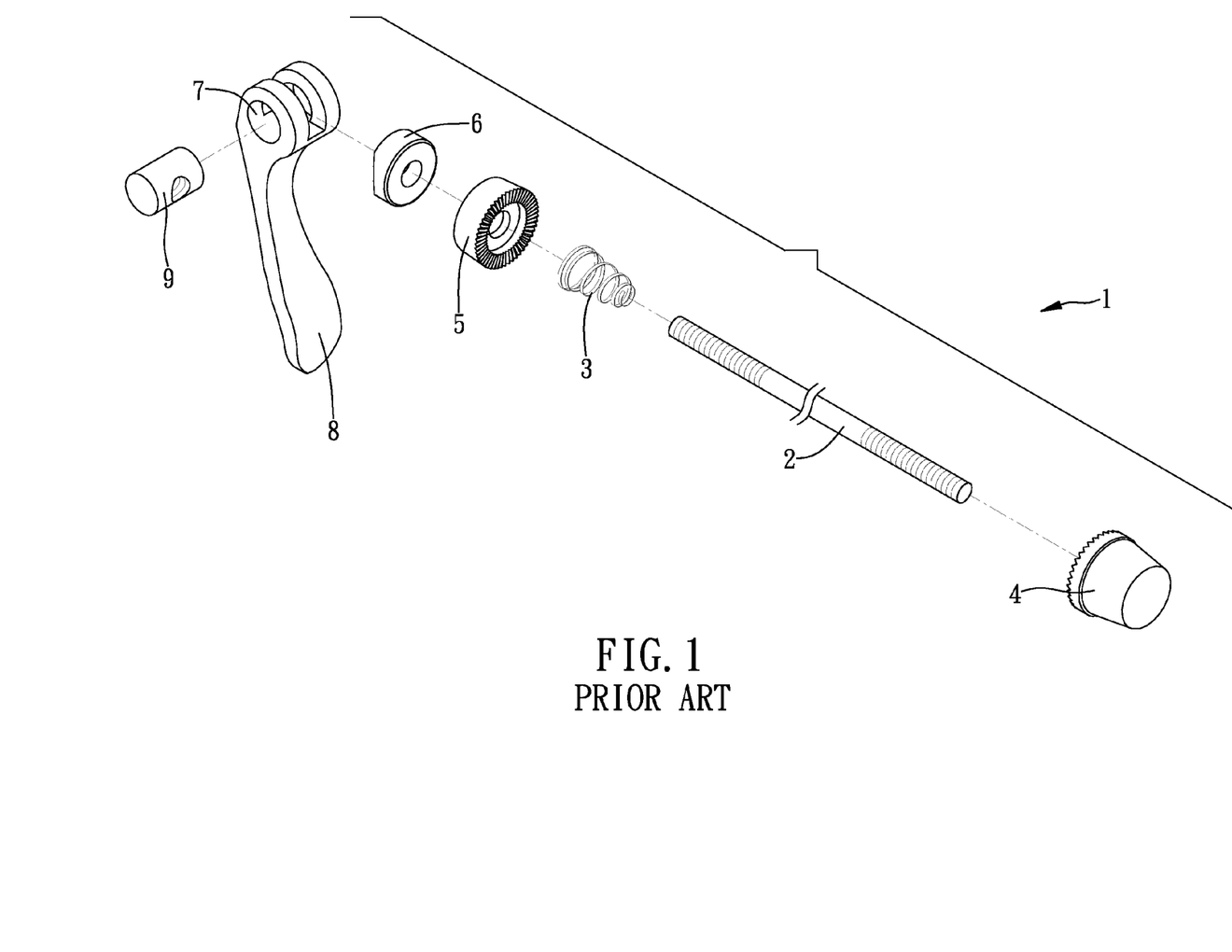
FIG. 1 is an exploded perspective view of a conventional quick-release device in accordance with the prior art.

A conventional quick-release device (1) for use on a bicycle in accordance with the prior art shown in FIG. 1 comprises a threaded rod (2), two springs (3) respectively sleeved on the threaded rod (2) and a nut (4) screwed onto a first end of the threaded rod (2). A presser (5) and a block (6) are sequentially sleeved on the threaded rod (2), wherein the two springs (3) respectively abut against the nut (4) and the presser (5). A lever (8) is pivotally connected to a second end of the threaded rod (2). The lever (8) includes an eccentrical hole (7) defined in a pivot end thereof to form a cam (not numbered), wherein the cam abuts against the block (6). An axle (9) is pivotally received in the eccentrical hole (7) and the threaded rod (2) is screwed into the axle (9).

As described above, the threaded rod (2) and the axle (9) of the conventional quick-release device (A) are connected to each other by spiral. However, the bicycle may cause vibration during riding passing a rough ground. As time passes, the connection between the axle (9) and the threaded rod (2) may be weakened due to the vibration from the bicycle. Moreover, the threaded rod (2) may be detached from the axle (9). As a result, the conventional quick-release device (A) may be disassembled. It is very dangerous when riding the bicycle.

The present invention has arisen to mitigate and/or obviate the disadvantages of the conventional quick-release device (1).

SUMMARY OF THE INVENTION

The main objective of the present invention is to provide an improved quick-release device that can overcome the vibration from a riding bicycle.

To achieve the objective, the quick-release device in accordance with the present invention comprises a lever including through hole laterally and eccentrically defined in one end thereof to form a cam thereon, and a groove defined in the cam and communicating with the through hole. An axle is rotatably received in the through hole in the lever. The axle includes a through hole diametrically defined therein. An indentation is radially defined in the axle and communicates with the through hole in the axle, wherein the indentation communicates with the groove when the axle is rotatably received in the through hole in the lever. A first abutment is formed on a bottom of the indentation. A shaft extends through the axle. The shaft includes a shank and a head integrally formed on a first end of the shank such that a second abutment is formed between the shank and the head. The shank sequentially extends through the indentation and the through hole in the axle to make the head positioned in the indentation, and the first abutment and the second abutment abut each other. A force device is sleeved on the shank and includes a curved groove defined therein for partially receiving the cam. A spring is sleeved on the shank and compressively abutting the force device. A nut is screwed onto a second end of the shank.

The head (32) is integrally formed on the shank (31) and held in the indentation (22) in the axle (20) such that the connection between the axle (20) and the shaft (30) is enhanced. In addition, the head (32) would not be departed from the shank (31) due to the vibration form the moving bicycle such that the quick-release device can promote the safety during riding bicycle when being mounted onto a bicycle.

Further benefits and advantages of the present invention will become apparent after a careful reading of the detailed description with appropriate reference to the accompanying drawings.

DETAILED DESCRIPTION OF THE INVENTION

Figure 2:
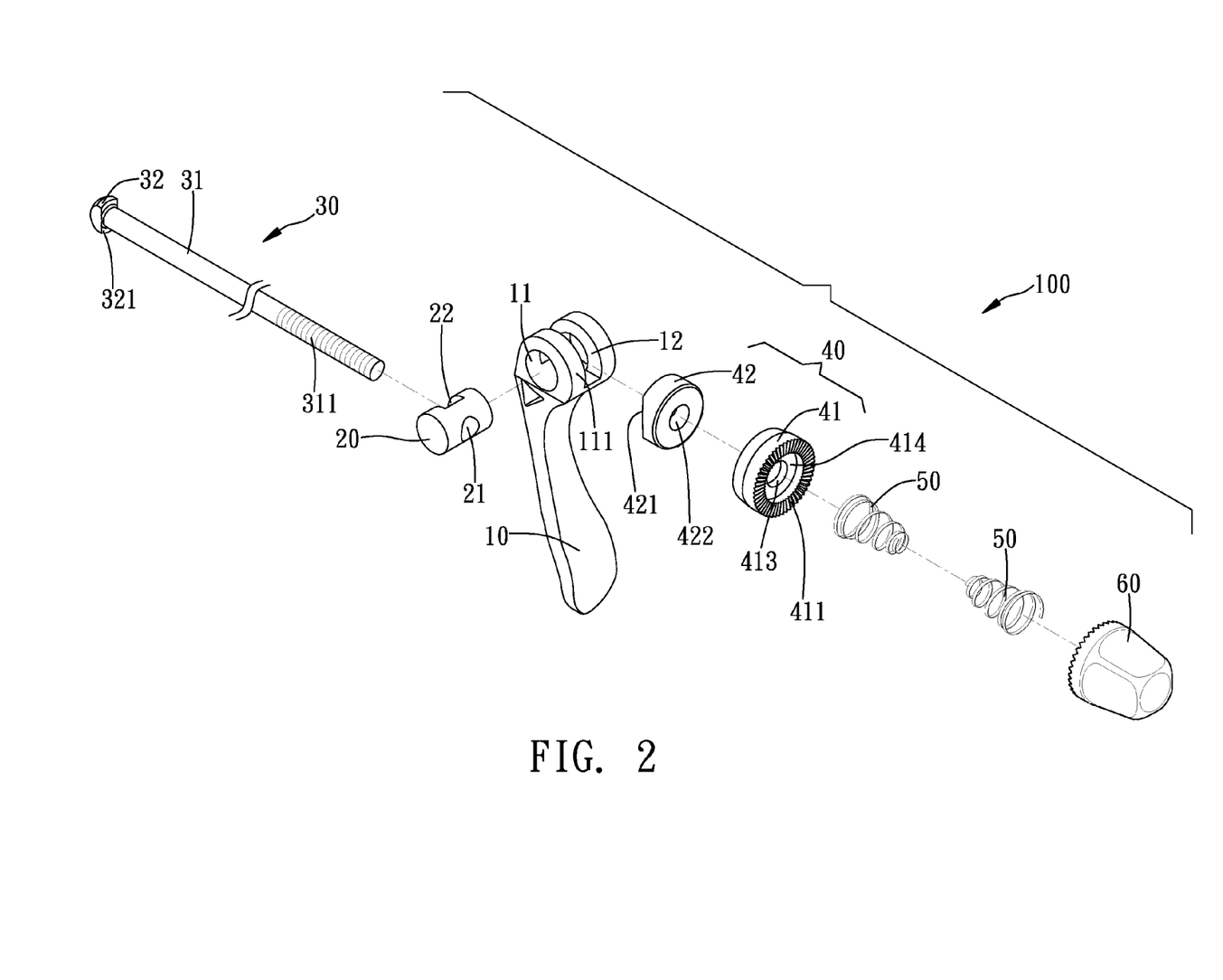
FIG. 2 is an exploded perspective view of a quick-release device in accordance with the present invention.
Figure 3:
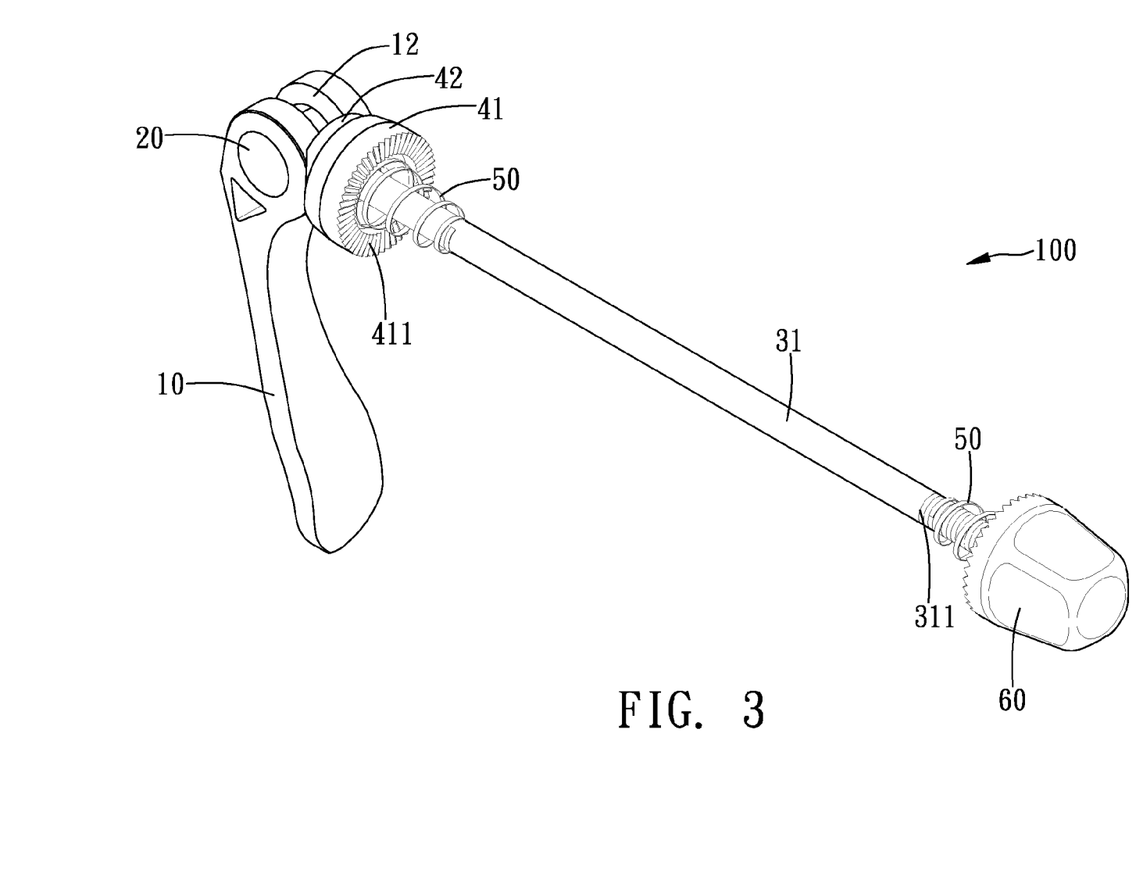
FIG. 3 is a perspective view of a quick-release device in accordance with the present invention.
Figure 4:
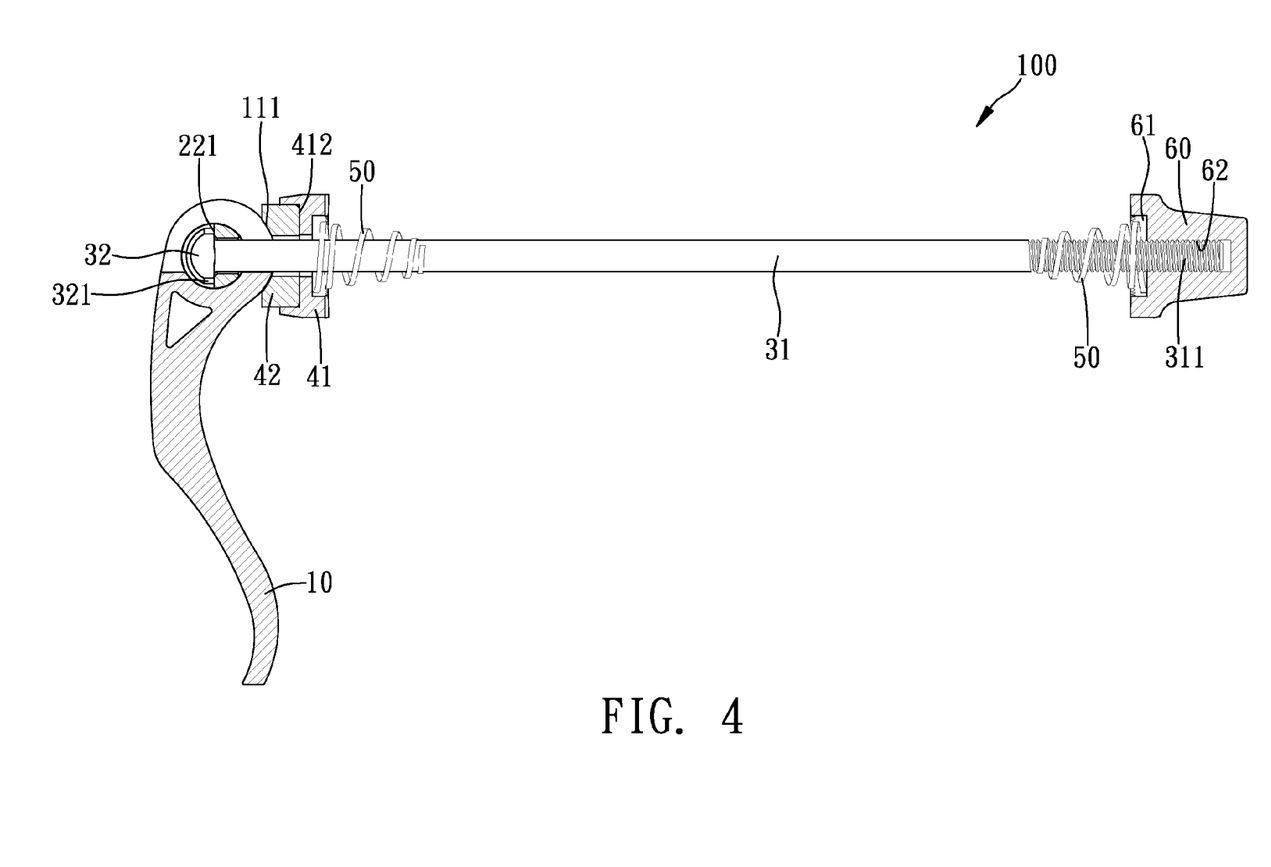
FIG. 4 is a side cross-sectional view of the quick-release device in FIG. 3
Figure 5:
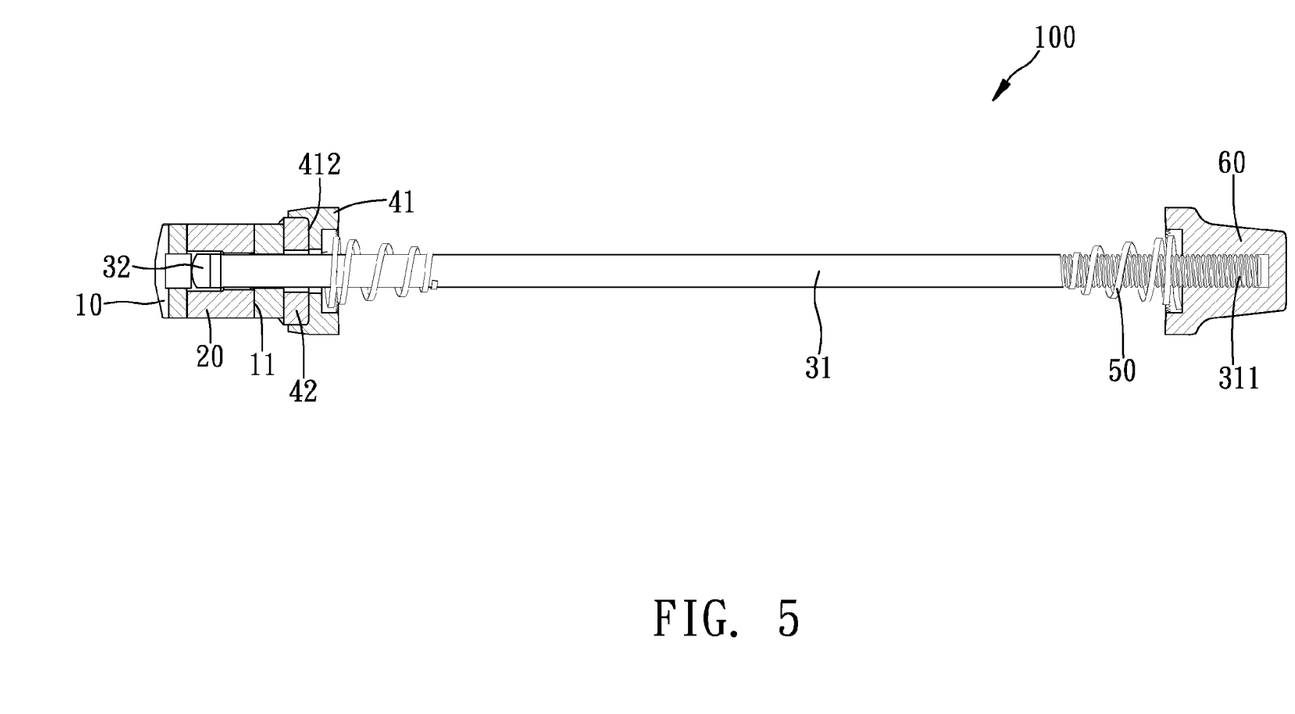
FIG. 5 is a top cross-sectional view of the quick-release device in FIG. 3.

Referring to the drawings and initially to FIGS. 2-4, a quick-release device (100) for use on a bicycle in accordance with the present invention comprises lever (10), an axle (20) rotatably received in the lever (10), a shaft (30) extending through the axle (20), a force device (40) sleeved on the shaft (30), at least one spring (50) sleeved on the shaft (30) and a nut (60) screwed onto the shaft (30). In the preferred embodiment of the present invention, there are two springs (50) respectively sleeved on the shaft (30).

The lever (10) has a through hole (11) laterally and eccentrically defined in one end thereof to formed a cam (111) thereon. A groove (12) is defined in the cam (111) and communicates with the through hole (11).

The axle (20) is rotatably received in the through hole (11) in the lever (10) and includes a through hole (21) diametrically defined therein. An indentation (22) is radially defined in the axle (20) and communicates with the through hole (21) in the axle (20), wherein the indentation (22) communicates with the groove (12) when the axle (20) is rotatably received in the through hole (11). A first abutment (221) is formed on a bottom of the indentation (22).

The shaft (30) includes a shank (31) and a head (32) integrally formed on a first end of the shank (31) such that a second abutment (321) is formed between the shank (31) and the head (32), wherein the head (32) complementally corresponds to the indentation (22). A threaded portion (311) is formed on a second end of the shank (31). The shank (31) sequentially extends through the indentation (22) and the through hole (21) in the axle (20), and the head (32) is held in the indentation (22) to make the second abutment (321) and the first abutment (221) abut each other. As a result, the shank (31) can not be rotated relative to the axle (20).

The force device (40) includes a block (42) and a fastener (41) sequentially sleeved on the shank (31). The fastener (41) includes a series of teeth (411) radially formed on a first side thereof and a recess (412) centrally defined in a second side thereof. A T-shaped hole (413) is centrally defined in the first side of the fastener (41) and communicates with the recess (412) to allow the shank (31) extending through the fastener (41). The T-shaped hole (413) has a first section and a second section, wherein first section has a diameter greater than that of the second section such that a shoulder (414) is formed in the fastener (41). The block (42) is partially received in the recess (412) in the fastener (41). A curved groove (421) is defined in one side of the block (42) for partially receiving the cam (111). A central hole (422) is defined in and extends through the block (42) such that the shank (31) extends through the block (42) via the central hole (422).

The nut (60) has a recess (61) centrally defined in one side thereof and a threaded hole (62) centrally defined in a bottom of the recess (61) in the nut (60). The spring (50) is sleeved on the shank (31) and abuts against the bottom of the shoulder (414) when the quick-release device (100) in accordance with the present invention has only one spring (50). However, the two springs (50) are respectively sleeved on the shank (31) and compressively abut against the shoulder (414) and the bottom of the recess (61) in the nut (60) when the quick-release device (100) in accordance with the present invention includes two springs (50). The threaded portion (311) is crewed into the threaded hole (62).

As described above, the head (32) is integrally formed on the shank (31) and held in the indentation (22) in the axle (20) such that the connection between the axle (20) and the shaft (30) is enhanced. In addition, the head (32) would not be departed from the shank (31) due to the vibration form the moving bicycle such that the quick-release device can promote the safety during riding bicycle when being mounted onto a bicycle.

Figure 6:
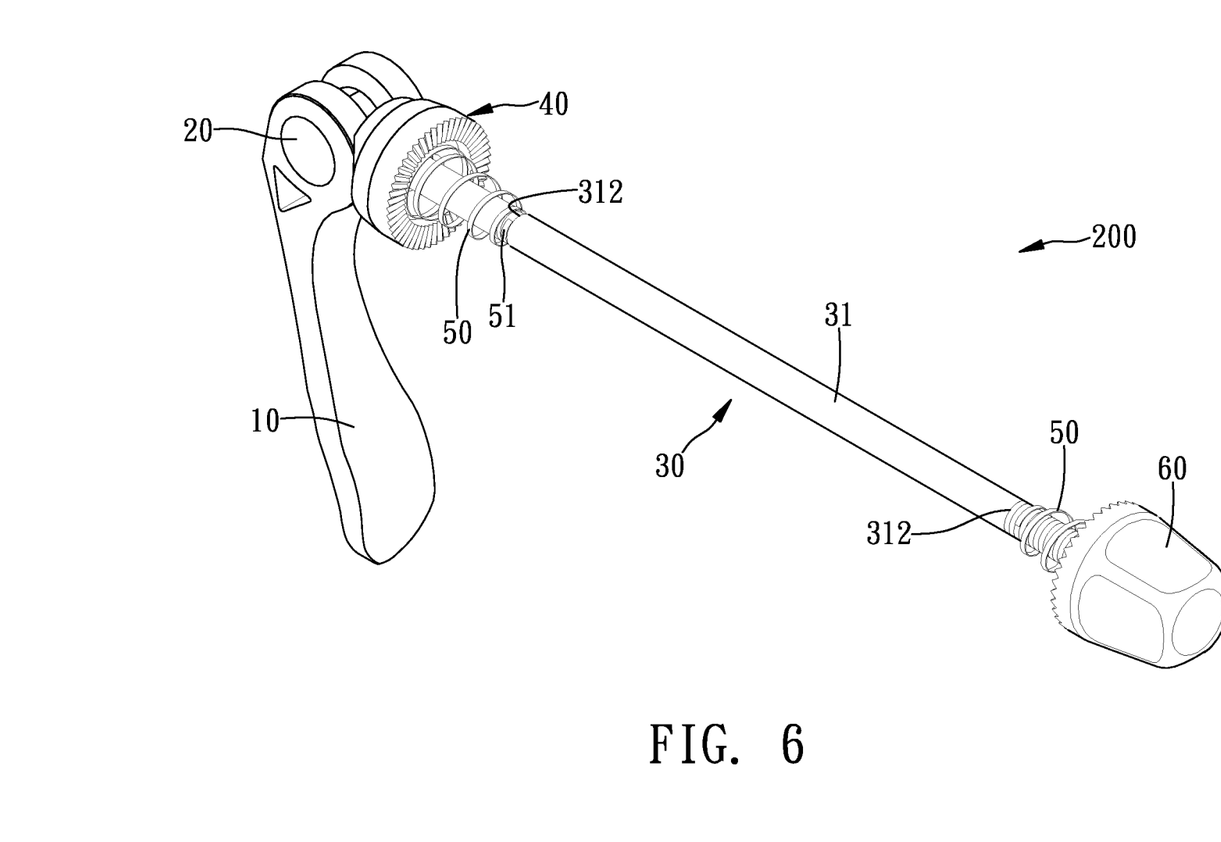
FIG. 6 is a perspective view of a second embodiment of the quick-release device in accordance with the present invention.
Figure 7:
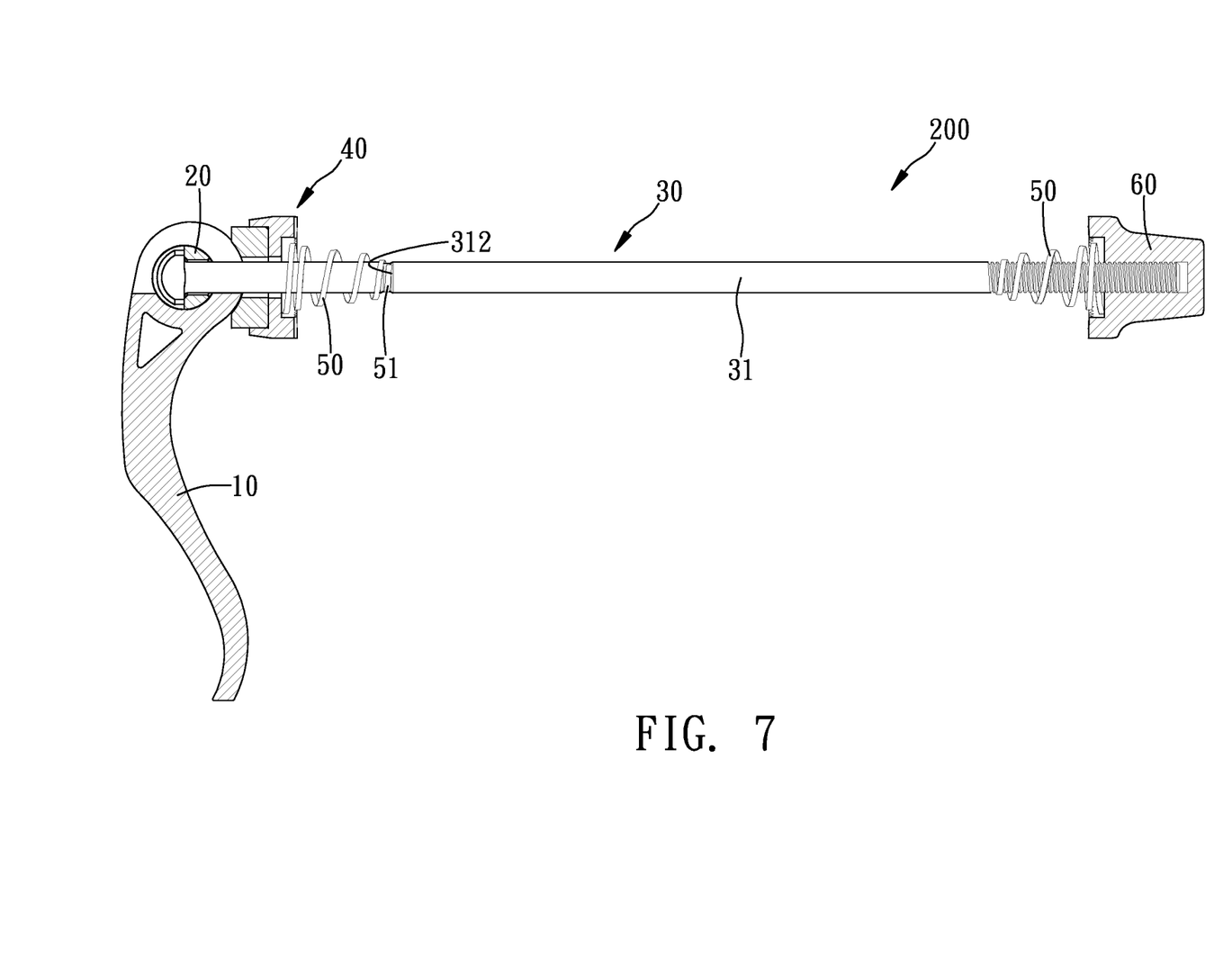
FIG. 7 is a side cross-sectional view of the quick-release device in FIG. 6.

With reference to FIGS. 6 and 7 that shown a second embodiment of the quick-release device (200) in accordance with the present invention, in this embodiment, the shank (31) further includes at least one annular groove (312) defined therein for positioning a distal end (51) of the at least one spring (50).

Figure 8:
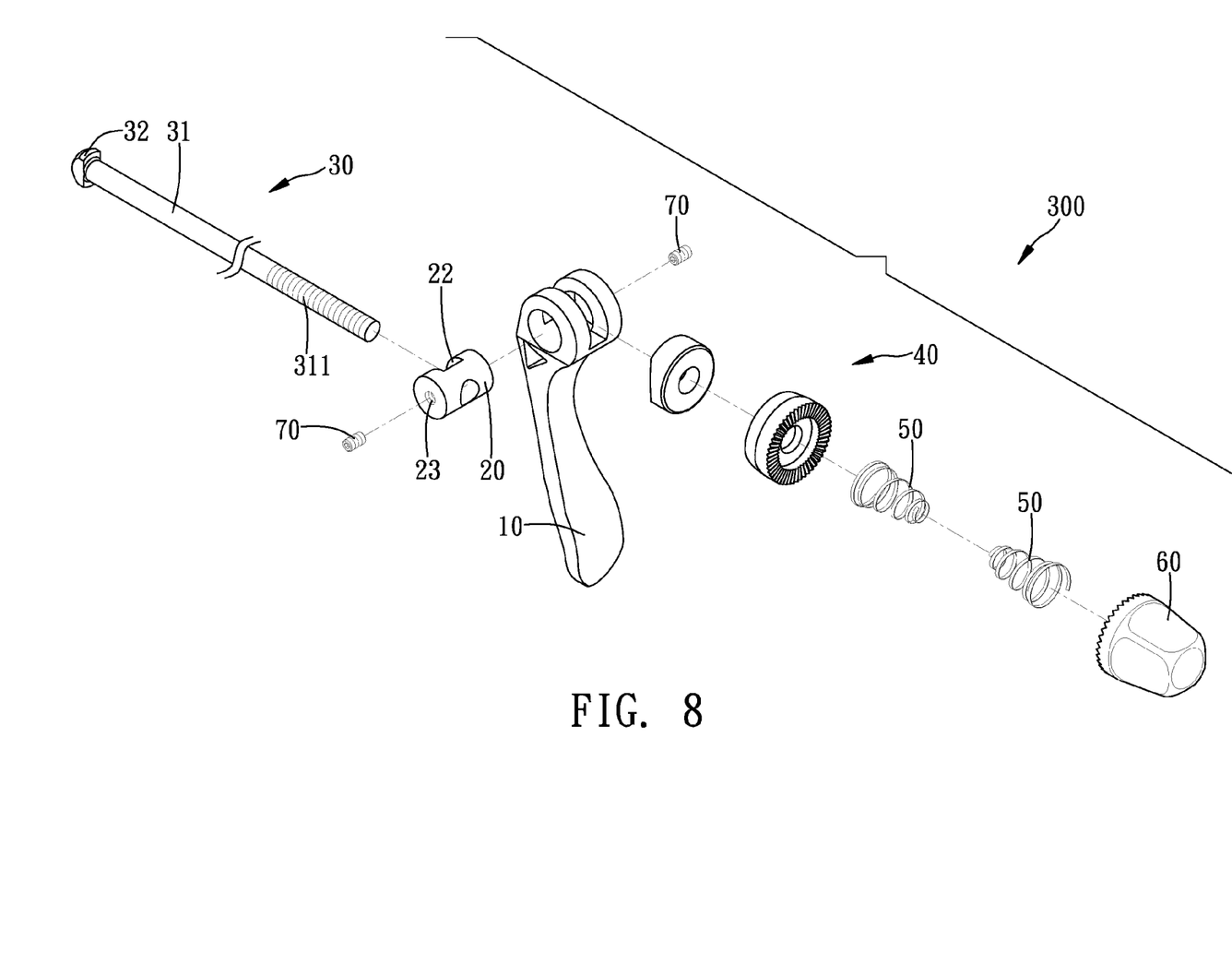
FIG. 8 is an exploded perspective view of a third embodiment of the quick-release device in accordance with the present invention.
Figure 9:
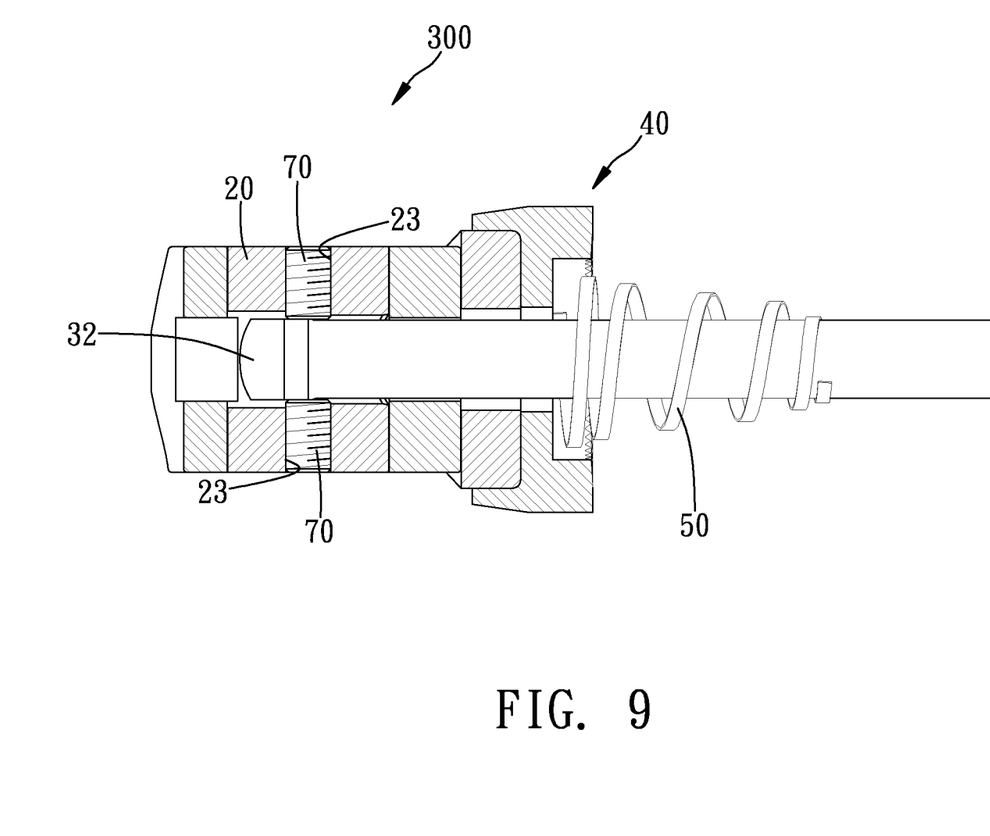
FIG. 9 is a partially cross-sectional view of the quick-release device in FIG. 8.

With reference to FIGS. 8 and 9 that show a third embodiment of the quick-release device (300) in accordance with the present invention, in this embodiment, the axle (20) further includes two threaded holes (23) respectively centrally defined in two opposite sides of the axle (20), wherein each threaded hole (23) laterally communicates with the indentation (22) and has a bolt (70) screwed therein. The bolts (70) are rotated and extend to secure the head (32) of the shaft (30) for promoting the connection between the axle (20) and the shaft (30).

Although the invention has been explained in relation to its preferred embodiment, it is to be understood that many other possible modifications and variations can be made without departing from the spirit and scope of the invention as hereinafter claimed.

What is claimed is:

1. A quick-release device for use on a bicycle, comprising:
    a lever including through hole laterally and eccentrically defined in one end thereof to form a cam thereon, and a groove defined in the cam and communicating with the through hole;
    an axle rotatably received in the through hole in the lever, the axle including a through hole diametrically defined therein, an indentation radially defined in the axle and communicating with the through hole in the axle, wherein the indentation communicates with the groove when the axle is rotatably received in the through hole in the lever, a first abutment formed on a bottom of the indentation;
    a shaft extending through the axle, the shaft including a shank and a head integrally formed on a first end of the shank such that a second abutment is formed between the shank and the head, the shank sequentially extending through the indentation and the through hole in the axle to make the head positioned in the indentation, and the first abutment and the second abutment abutting each other;
    a force device sleeved on the shank and including a curved groove defined therein for partially receiving the cam; and
    a spring sleeved on the shank and compressively abutting the force device.

2. The quick-release device as claimed in claim 1, wherein the force device includes a block and a fastener sequentially sleeved on the shank, wherein:
    the fastener includes series of teeth radially formed on a first side thereof and a recess centrally defined in a second side thereof, a T-shaped hole centrally defined in the first side of the fastener and communicating with the recess to allow the shank extending through the fastener, the T-shaped hole having a first section and a second section, wherein the first section has a diameter greater than that of the second section such that a shoulder is formed in the fastener, the spring abutting against the shoulder; and
    the block is partially received in the recess in the fastener and the curved groove is defined in the block opposite to the fastener, a central hole defined in and extending through the block such that the shank extending through the block via the central hole.

3. The quick-release device as claimed in claim 1, wherein the shank includes an annular groove defined therein for positioning a distal end of the spring.

4. The quick-release device as claimed in claim 1, wherein the axle includes two threaded holes respectively centrally defined in two opposite sides of the axle, wherein each threaded hole laterally communicates with the indentation and has a bolt screwed therein, the bolts rotated and extend to secure the head of the shaft for promoting the connection between the axle and the shaft.

5. The quick-release device as claimed in claim 2, wherein the shank includes an annular groove defined therein for positioning a distal end of the spring.

6. The quick-release device as claimed in claim 2, wherein the axle includes two threaded holes respectively centrally defined in two opposite sides of the axle, wherein each threaded hole laterally communicates with the indentation and has a bolt screwed therein, the bolts rotated and extend to secure the head of the shaft for promoting the connection between the axle and the shaft.

7. The quick-release device as claimed in claim 3, wherein the axle includes two threaded holes respectively centrally defined in two opposite sides of the axle, wherein each threaded hole laterally communicates with the indentation and has a bolt screwed therein, the bolts rotated and extend to secure the head of the shaft for promoting the connection between the axle and the shaft.

8. The quick-release device as claimed in claim 5, wherein the axle includes two threaded holes respectively centrally defined in two opposite sides of the axle, wherein each threaded hole laterally communicates with the indentation and has a bolt screwed therein, the bolts rotated and extend to secure the head of the shaft for promoting the connection between the axle and the shaft.

9. The quick-release device as claimed in claim 1 further comprising a nut screwed onto a second end of the shank.

10. A quick-release device for use on a bicycle, comprising:
- a lever including through hole laterally and eccentrically defined in one end thereof to form a cam thereon, and a groove defined in the cam and communicating with the through hole;
- an axle rotatably received in the through hole in the lever, the axle including a through hole diametrically defined therein, an indentation radially defined in the axle and communicating with the through hole in the axle, wherein the indentation communicates with the groove when the axle is rotatably received in the through hole in the lever, a first abutment formed on a bottom of the indentation;
- a shaft extending through the axle, the shaft including a shank and a head integrally formed on a first end of the shank such that a second abutment is formed between the shank and the head, the shank sequentially extending through the indentation and the through hole in the axle to make the head positioned in the indentation, and the first abutment and the second abutment abutting each other;
- a force device sleeved on the shank and including a curved groove defined therein for partially receiving the cam;
- a spring sleeved on the shank.

11. The quick-release device as claimed in claim 10, wherein the force device includes a block and a fastener sequentially sleeved on the shank, wherein:
- the fastener includes series of teeth radially formed on a first side thereof and a recess centrally defined in a second side thereof, a T-shaped hole centrally defined in the first side of the fastener and communicating with the recess to allow the shank extending through the fastener, the T-shaped hole having a first section and a second section, wherein the first section has a diameter greater than that of the second section such that a shoulder is formed in the fastener, the a corresponding one of the two springs abutting against the shoulder; and
- the block is partially received in the recess in the fastener and the curved groove is defined in the block opposite to the fastener, a central hole defined in and extending through the block such that the shank extending through the block via the central hole.

12. The quick-release device as claimed in claim 10, wherein the shank includes two annular grooves defined therein for positioning a distal end of each of the two springs.

13. The quick-release device as claimed in claim 10, wherein the axle includes two threaded holes respectively centrally defined in two opposite sides of the axle, wherein each threaded hole laterally communicates with the indentation and has a bolt screwed therein, the bolts rotated and extend to secure the head of the shaft for promoting the connection between the axle and the shaft.

14. The quick-release device as claimed in claim 11, wherein the shank includes two annular grooves defined therein for positioning a distal end of each of the two springs.

15. The quick-release device as claimed in claim 11, wherein the axle includes two threaded holes respectively centrally defined in two opposite sides of the axle, wherein each threaded hole laterally communicates with the indentation and has a bolt screwed therein, the bolts rotated and extend to secure the head of the shaft for promoting the connection between the axle and the shaft.

16. The quick-release device as claimed in claim 12, wherein the axle includes two threaded holes respectively centrally defined in two opposite sides of the axle, wherein each threaded hole laterally communicates with the indentation and has a bolt screwed therein, the bolts rotated and extend to secure the head of the shaft for promoting the connection between the axle and the shaft.

17. The quick-release device as claimed in claim 14, wherein the axle includes two threaded holes respectively centrally defined in two opposite sides of the axle, wherein each threaded hole laterally communicates with the indentation and has a bolt screwed therein, the bolts rotated and extend to secure the head of the shaft for promoting the connection between the axle and the shaft.

18. The quick-release device as claimed in claim 10 further comprising a nut screwed onto a second end of the shank, wherein the two springs respectively compressively abut against the force device and the nut.

* * * * *